(12) United States Patent
Cherny et al.

(10) Patent No.: US 7,451,350 B2
(45) Date of Patent: Nov. 11, 2008

(54) OBJECT ORIENTED SCALEABLE TEST EXECUTIVE

(75) Inventors: Jeffrey G. Cherny, Chesterland, OH (US); David A. Gehring, Mentor, OH (US); Robert L. Lupica, Willoughby, OH (US); James A. Wojcik, Parma, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 152 days.

(21) Appl. No.: 10/784,626

(22) Filed: Feb. 23, 2004

(65) Prior Publication Data

US 2004/0168106 A1 Aug. 26, 2004

Related U.S. Application Data

(63) Continuation of application No. 09/616,261, filed on Jul. 14, 2000, now Pat. No. 6,732,296.

(51) Int. Cl.
*G06F 11/00* (2006.01)

(52) U.S. Cl. .................. 714/32; 714/46; 717/130; 717/135; 717/124; 703/26

(58) Field of Classification Search ........... 714/33, 714/32, 35, 25, 46; 717/130, 135, 129, 107, 717/124, 145; 703/20, 22, 26; 700/26, 21
See application file for complete search history.

(56) References Cited

U.S. PATENT DOCUMENTS

| | | | | |
|---|---|---|---|---|
| 5,960,201 A | * | 9/1999 | Ma et al. | 717/154 |
| 6,083,269 A | * | 7/2000 | Graef et al. | 703/14 |
| 6,112,312 A | * | 8/2000 | Parker et al. | 714/32 |
| 6,167,352 A | * | 12/2000 | Kanevsky et al. | 702/81 |
| 6,173,438 B1 | * | 1/2001 | Kodosky et al. | 717/109 |
| 6,182,279 B1 | * | 1/2001 | Buxton | 717/100 |
| 6,192,331 B1 | * | 2/2001 | Gaessler et al. | 703/22 |
| 6,195,616 B1 | * | 2/2001 | Reed et al. | 702/119 |
| 6,453,276 B1 | * | 9/2002 | Bauman | 703/15 |
| 6,609,230 B1 | * | 8/2003 | Li | 716/5 |
| 6,647,513 B1 | * | 11/2003 | Hekmatpour | 714/37 |
| 2002/0078424 A1 | * | 6/2002 | Buckley, Jr. | 716/5 |
| 2005/0246720 A1 | * | 11/2005 | Lainer et al. | 719/318 |

OTHER PUBLICATIONS

Microsoft Computer Dictionary, 4th Ed., Microsoft Press, 1999, pp. 96, 97, 207.*

* cited by examiner

*Primary Examiner*—Robert Beausoliel
*Assistant Examiner*—Christopher McCarthy
(74) *Attorney, Agent, or Firm*—Amin, Turocy & Calvin, LLP

(57) ABSTRACT

The present invention provides for a test system having a test executive software system for performing tests on units under test. The test executive software system includes a test kernel component that provides control through a generic interface to the test executive software. Test components, instrument components, support objects and a test system interface component are communicatively coupled to the test kernel component. The instrument components can be written as a dynamically linked library (DLL) file so that the instrument component can be broken into basic functional modules associated with the particular instrument type. Each instrument component supports operation in both live mode and virtual mode, so that testing can be performed in both normal mode and simulation mode. Virtual mode allows instruments to be inserted and removed without impacting test applications that do not utilize them, thereby reducing tester downtime.

18 Claims, 15 Drawing Sheets

```
// Dmm.cpp : Defines the entry point for the DLL application.

#include "stdafx.h"
#include "Dmm.h"
#include "instruments.h"
#include <stdio.h>
#include <stdlib.h>
#include <string.h>
#include <math.h>

// Define handler functions
void DmmErrorHandler(INST inst, INT iError);
void DmmSRQHandler(INST id );

// Instrument Control Strings
#define EOI                 "END ALWAYS" // Used to turn on the EOI required by SICL's iread()
#define RESET               "RESET"
#define QUERY_MODE          "FUNC?"
#define QUERY_RANGE         "RANGE?"
#define QUERY_ARANGE    "ARANGE?"
#define QUERY_FOR_ERROR "ERR?"

BOOL APIENTRY DllMain( HANDLE hModule,
            DWORD  ul_reason_for_call,
            LPVOID lpReserved
{
    switch (ul_reason_for_call)
        {
                case DLL_PROCESS_ATTACH:
                case DLL_THREAD_ATTACH:
                case DLL_THREAD_DETACH:
                case DLL_PROCESS_DETACH:
                        break;
    }
    return TRUE;
}

CDmm::CDmm(CHAR *pcDeviceInstance) : CInstr( pcDeviceInstance ) {
        INT iPrimAddress = GetPrimaryAddress(); // Defined in the base class
        INT m_iLiveMode = GetLiveMode();   // Defined in the base class
        m_pCL = (CIeee488 *)NULL;
        CHECK_IF_LIVE(
                        m_eMode = DCV;
                        m_eRange = AUTORANGE;
                        return
    )
        m_pCL = new CIeee488(iPrimAddress);
        m_pCL->InstallErrorHandler(DmmErrorHandler);
        m_pCL->InstallSRQHandler(DmmSRQHandler);
        m_pCL->SetTimeout(5000);
        m_pCL->Write(EOI, strlen(EOI)); // Turn On The EOI
        GetCurrentDmmState();
}
CDmm::~CDmm() {
        CHECK_IF_LIVE( return )
        delete m_pCL;
}
```

```
#ifndef _INC_MODULETEST_H_
#define _INC_MODULETEST_H_                                   ← 200

// Required system includes
#include "dmm.h"
#include "eload.h"
#include "dcpwr.h"
#include "acpwr.h"                                           ← 202
#include "dio.h"
#include "relay.h"
#include "source.h"
#include "support.h"
#include "Test.h"

class CModuleTest:public CTest
{
public:                                                      ← 204
        CModuleTest(CRuntimeTestInfo *rRti);
        ~CModuleTest();

#error Uncomment test level(s) required by your product
        //void Ambient();
        //void Calibration();
        //void Final();
        //void FunctionalModule();
        //void FunctionalSystem();
206     //void PreHeatedHot();
        //void Troubleshooting();

//void InitializeSystem();
        //void CleanupSystem();
        //void GetRequiredInstruments();

private:
        // Add private data members and functions here
protected:
        // Add protected data members and functions here
};
endif
```

Fig. 5a

```
#include "stdafx.h"
#include "Test.h"
#include "CModuleTest.h"                    ← 210
#include "instruments.h"
#include "support.h"

#error Replace SSW#### in the g_pcSoftwareID[] variable declaration below with the correct SSW
number, ie: SSW1234
char g_pcSoftwareID[] = {"SSW####"};
char g_pcSoftwareRevision[] = {"$Revision$"};

// Name: FunctionalModule
// Description:                      ← 212
// Return type: void
// Author: YourNameHere
// Revision History:
//              2/21/2000 12:42:26 PM   Initial Coding          YourInitials
//vvvvvvvvvvvvvvvvvvvvvvvvvvvvvvvvvvvvvvvvvvvvvvvvvvvvvvvvvvvvv
//void CModuleTest::FunctionalModule()
//{
//}

// Name: FunctionalSystem             ← 212
// Description:
// Return type: void
// Author: YourNameHere
// Revision History:
//              2/21/2000 12:42:33 PM   Initial Coding          YourInitials
//vvvvvvvvvvvvvvvvvvvvvvvvvvvvvvvvvvvvvvvvvvvvvvvvvvvvvvvvvvvvv
//void CModuleTest::FunctionalSystem()
//{
//}

// Name: PreHeatedHot                 ← 212
// Description:
// Return type: void
// Author: YourNameHere
// Revision History:
//              2/21/2000 12:42:38 PM   Initial Coding          YourInitials
//vvvvvvvvvvvvvvvvvvvvvvvvvvvvvvvvvvvvvvvvvvvvvvvvvvvvvvvvvvvvv
//void CModuleTest::PreHeatedHot()
//{
//}
```

Fig. 5b

```
#include "stdafx.h"
#ifndef _INC_MODULETEST_H_
#define _INC_MODULETEST_H_

// Required system includes
#include "dmm.h"
#include "eload.h"
#include "dcpwr.h"
#include "acpwr.h"
#include "dio.h"
#include "relay.h"
#include "source.h"
#include "support.h"
#include "Test.h"

class CModuleTest:public CTest {
public:
        CModuleTest(CRuntimeTestInfo *rRti);
        ~CModuleTest();

//      #error Uncomment test level(s) required by your product
        //void Ambient();
        //void Calibration();
        //void Final();
        void FunctionalModule();
        //void FunctionalSystem();
        //void PreHeatedHot();
        //void Troubleshooting();
        void InitializeSystem();
//      void CleanupSystem();
//      void GetRequiredInstruments();

private:

//      #error Uncomment the instruments required by your test
        CDmm    *m_pDmm;
//      CDaq    *m_pDaq;
//      Source      *m_pSource;
        CDCPwr      *m_pDc1;
//      CDCPwr      *m_pDc2;
        CDCPwr      *m_pDc3;
//      CACPwr      *m_pAc;
        CRelay      *m_pRelays;
        CDio    *m_pDio;
//      CELoad      *m_pLoad;

protected:
};
endif extern "C" __declspec(dllexport) CModuleTest* CreateObject(CRuntimeTestInfo *rRti);
extern "C" __declspec(dllexport) void GetSoftwareId( char *pcSwIdBuf, int iSizeOfSwIdBuf, float *fSwRev );
```

Fig. 7a

```
#include "stdafx.h"
#ifndef _INC_ void CModuleTest::FunctionalModule() {

// Define all instruments used in this test (Typically this
    // would be done in this classes constructor, but is placed here
    // for clarity CDCPwr *m_poDcPwr1 = NULL;
    CRelay *m_poRelays = NULL;
    CDmm   *m_poDmm    = NULL;

// Instantiate the following instrument; DC Power Supply, Relay,
    // and DMM. Again, this would typically be done within the
    // classes constructor but is added here for clarity
    m_poDcPwr1 = new CDCPwr("DCPS_1");
    m_poRelays = new CRelay("RELAYS");
    m_poDmm    = CDmm("DMM_1");

// Close Power Relay's 0 & 1. This illustrates one way the
    // DC power supply could be connected to the unit under test.
    m_poRelays->Close(PR, 0);
    m_poRelays->Close(PR, 1);

// Now, close Analog Relays 0 & 1. This illustrates how the DMM
    // could be connected to the power supply connector on the unit
    // under test.
    m_poRelays->Close(AR, 0);
    m_poRelays->Close(AR, 1);

// Now setup the DMM to operate in DCV mode and AUTORANGE
    m_poDmm->SetMode( DCV );
    m_poDmm->SetRange( AUTORANGE );

// Display the current test step on the screen for the operator
    DisplayTestStep( "Power Supply Test");

// Set the DC power supply to output 24Vdc with a max. current of
    // 1.0 Amps
    m_poDcPwr1->SetOutputValue( 24.0 );
    m_poDcPwr1->SetCurrentLimit( 1.0 );

// Perform a reading from the DMM
    double dReading = m_poDmm->Read();

// Check that the reading performed above is between 25.0Vdc
    // & 23.0 Vdc. If this fails, the test will terminate and the
    // error logged
    VerifyAndLogError("Verify Unit 24VDC Input", dReading, 25.0,
                      23.0, "VDC");

// Reset all of the Analog Relays in the system
    m_poRelays->Reset(AR);
```

Fig. 7b

OBJECT ORIENTED SCALEABLE TEST EXECUTIVE

CROSS-REFERENCE TO RELATED APPLICATIONS

This application is a continuation application of U.S. patent application Ser. No. 09/616,261, filed Jul. 14, 2000 now U.S. Pat. No. 6,732,296, entitled OBJECT ORIENTED SCALEABLE TEST EXECUTIVE.

TECHNICAL FIELD

The present invention generally relates to test systems and in particular to a test executive software system and a method for developing tests to verify the functionality of industrial control modules.

BACKGROUND OF THE INVENTION

Industrial controllers are special purpose computers used for controlling factory automation devices. Under the direction of a stored program, a processor of the industrial controller examines a series of inputs reflecting the status of a controlled processor or device and changes outputs affecting control of the controlled process or device. The inputs and outputs may be of an analog or digital nature. Generally industrial controllers are constructed in modular fashion to accommodate different application requiring different numbers and types of input/output (I/O) circuits as are determined by the particular device or process being controlled. In such modular systems, a number of different functional modules connect together through a common backplane in a rack to share data and power. However, other types of modules forming industrial controller solutions include communication modules adapted to provide communication links, counter/encoder modules for monitoring motor position information, programming modules adapted to be programmable to function according to a user's instructions, relay modules typically provided to shut off automated devices and control modules adapted to control and operate industrial control modules.

Prior to the introduction of industrial control modules into a factory environment, the modules are tested by a test system to verify the proper operation and functionality of the industrial control module. These test systems employ software to control and operate instrumentation that provide input stimulus and perform measurements to verify the proper functional operation of the industrial control modules. Typical test system software employed to test industrial control modules suffer from several deficiencies. For example, most test system software includes instrumentation drivers that are customized for that particular instrument. Typically these drivers are embedded within the actual product test code. When this instrumentation becomes out of date or obsolete, new drivers must be written or installed to operate the new equipment requiring updates to all product tests utilizing this instrument. Furthermore, most test system software is written to function in a particular operating system and is not portable to other operating systems. Additionally, during the test development process, a test developer needs access to a test system and the instrumentation of the test system to verify that a test written by the developer will operate properly. Therefore, time-sharing of the test system is employed between test developers causing reduced throughput of tests ready for implementation into production. Typically, tests are verified by running tests during development with the instrumentation off, so that damage to the instrumentation does not occur. However, a developer cannot be assured that a test will operate properly until the test is run with the instrumentation on. A developer cannot be absolutely assured that a test will not cause damage to instrumentation or the unit under test once the instrumentation is live, until all the errors are eliminated from the test.

Therefore, it is apparent that there is an unmet need for a test software that is employed on a test system that mitigates the aforementioned deficiencies.

SUMMARY OF THE INVENTION

The present invention provides for a test system having a test executive software system for performing tests on industrial control modules. The test executive software system includes a test kernel component that provides control through a generic interface to the test executive software. Test components, instrument components, support objects and test system interface components are communicatively coupled to the test kernel component. The generic interface allows for easy substitution or replacement of components without affecting the basic functionality of the test executive software. The instrument components can be written as dynamically linked library (DLL) files, so that the instrument component can be broken into basic functional modules associated with the particular instrument type. This allows for simple editing of the DLL for replacing obsolete instruments with other instruments without effecting product test applications. Each instrument component supports operation in both live mode and virtual mode, so that testing can be performed in both normal mode and simulation mode. Operating a test in simulation mode allows debugging of test components without the need for instrumentation. Simulation mode also allows for test development at a remote location on a standard personal computer.

In one aspect of the invention, a test template file(s) is provided that includes a plurality of test type level functions, function calls and standard instrument library calls that are all commented out. A test developer then uncomments the test type level functions, function calls and standard instrument libraries for that particular unit for which a test is being developed. The test developer then inserts test code into the functions and compiles the code to provide the test for that particular unit under test. The developer can employ a plurality of macros containing standardized code for the development of tests. This facilitates quick and error free development of tests. Preferably, the test template file(s) is also set up as a dynamically linked library and can be placed in the appropriate location after compiling to allow linking at runtime.

One particular aspect of the invention relates to a system for testing industrial control modules. The system comprises at least one instrument adapted to provide input stimulus and measurement readings for testing an industrial control module and at least one instrument component communicatively coupled to the at least one instrument. The system further comprises at least one test component adapted to provide a program flow to the input stimulus and the measurement readings of the plurality of instruments and a test kernel component adapted to provide a generic interface to the least one instrument component and the at least one test component.

Another aspect of the present invention relates to a method for developing tests for testing industrial control modules. The method comprises the steps of providing at least one test template file with a plurality of test level type functions commented out and uncommenting at least one of the test level type functions of the plurality of functions for testing an industrial control module. Code is then inserted into the at least one of the test level type functions employing a plurality of macros to provide functionality to the at least one of the test level type functions and the at least one test template file is linked to at least one instrument component. The at least one test template file is then executed in simulation mode to determine if the at least one test template file operates properly. Once it is determined that the at least one test template file operates properly the at least one test template file is executed in normal mode to test the industrial control module.

Another aspect of the present invention relates to a test system having a test executive software system having computer executable components. The system comprises a test kernel component providing a generic test system interface for the test executive software system and at least one instrument component communicatively coupled to the test kernel component. The at least one instrument component provides control to at least one instrument of the test system. At least one test component is communicatively coupled to the test kernel component. The at least one test component provides a test flow for testing a unit under test wherein the test kernel component initializes the test system and loads and executes instructions of the at least one test component and provides control information to the at least one instrument component based on the instructions of the at least one test component.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other advantages and novel features of the invention will become apparent from the following detailed description of the invention when considered in conjunction with the drawings.

BRIEF DESCRIPTION OF THE DRAWINGS

FIG. 2b illustrates a portion of a dynamic link library file for a digital multimeter in accordance with one aspect of the present invention;

FIG. 5a illustrates an example of a test template moduletest.h file in accordance with one aspect of the present invention;

FIG. 5b illustrates an example of a test template Cmoduletest.cpp file in accordance with one aspect of the present invention;

FIG. 7a illustrates an example of a test template moduletest.h file with selected test level types and selected instruments uncommented in accordance with one aspect of the present invention;

FIG. 7b illustrates an example of a test template Cmoduletest.cpp file with a simple test employed in a selected test level type in accordance with one aspect of the present invention;

DETAILED DESCRIPTION OF THE INVENTION

The present invention will now be described with reference to the drawings. The present invention will be described with reference to a test system having a test executive software system for testing industrial control modules. The present invention also provides for a method for developing tests for industrial control modules. It is to be appreciated that the present invention is described with respect to the testing of industrial control modules, but may be employed to test other types of products. It should be understood that the description of the various aspects of the present invention are merely illustrative and that they should not be taken in a limiting sense.

Figure 1:
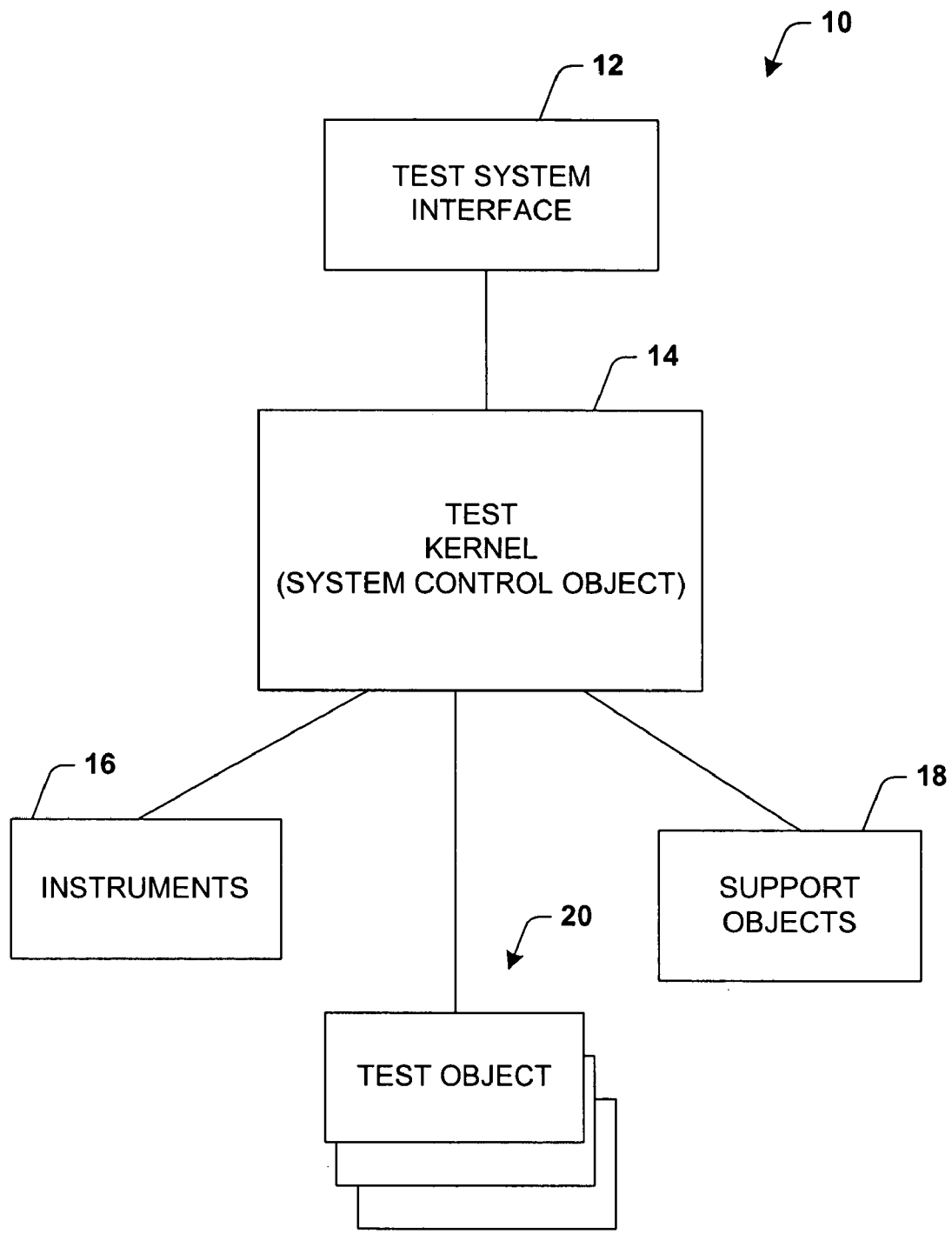
FIG. 1 illustrates a block diagram of a test executive software system in accordance with one aspect of the present invention.

FIG. 1 illustrates a schematic block diagram of a test executive software system 10 provided with a test kernel component 14 (system control object). The test kernel component 14 is communicatively coupled to a test system interface component 12, instrument components 16, support objects 18 and a plurality of test objects 20. The kernel component 14 is a central interface component that provides a generic interface to all components of the test executive software system 10. The kernel component 14 provides application program interfaces (APIs) to other test software components so that replacement of components is easily facilitated. For example, the test system interface component 12 can be a graphical user interface provided to a test operator for manual control of testing industrial control modules or other units under test (UUTs).

Alternatively, the test system interface component 12 can be an automated handler component that provides for automated testing of UUTs. The interface component 12 has no knowledge of other system components, other than the API exposed by the kernel component 14, thus supporting the design criteria of loosely coupled software components for maximum modularity. Furthermore, the test kernel component 14 allows for the instrument components 16, test objects 20 and support objects 18 to be easily replaced with other components and objects without affecting the overall functionality of the test executive system software 10.

Preferably, the kernel component 14 can also load and unload the test objects 20. The test objects 20 are the actual tests that were developed by a test developer. Preferably, the test objects 20 are explicitly linked dynamic linked libraries (DLLs). The kernel component 14 can also provide catch and process errors "thrown" by other software sub-systems, such as the instrument components 16. Since errors are thrown, test developers don't have to worry about the return status of library functions. Additionally, the kernel component 14 can provide test system initialization, define a standard API for use by the test system interface, supports sample testing, generate test reports and test yield data that can be inserted into a "Quality Information System" database used for statistical process control. The support objects 18 can provide functions such as system reset, failure tickets (e.g., Content, Format, . . . ), history files, data verification routines and test system self test.

The present invention may be implemented via object oriented programming techniques. In this case each component of the system, could be an object in a software routine or a component within an object. Object oriented programming shifts the emphasis of software development away from function decomposition and towards the recognition of units of software called "objects" which encapsulate both data and functions. Object Oriented Programming (OOP) objects are software entities comprising data structures and operations on data. Together, these elements enable objects to model virtually any real-world entity in terms of its characteristics, represented by its data elements, and its behavior represented by its data manipulation functions. In this way, objects can model concrete things like people and computers, and they can model abstract concepts like numbers or geometrical concepts.

The benefit of object technology arises out of three basic principles: encapsulation, polymorphism and inheritance. Objects hide or encapsulate the internal structure of their data and the algorithms by which their functions work. Instead of exposing these implementation details, objects present interfaces that represent their abstractions cleanly with no extraneous information. Polymorphism takes encapsulation one step further—the idea being many shapes, one interface. A software component can make a request of another component without knowing exactly what that component is. The component that receives the request interprets it and figures out according to its variables and data how to execute the request. The third principle is inheritance, which allows developers to reuse pre-existing design and code. This capability allows developers to avoid creating software from scratch. Rather, through inheritance, developers derive subclasses that inherit behaviors which the developer then customizes to meet particular needs.

In particular, an object includes, and is characterized by, a set of data (e.g., attributes) and a set of operations (e.g., methods), that can operate on the data. Generally, an object's data is ideally changed only through the operation of the object's methods. Methods in an object are invoked by passing a message to the object (e.g., message passing). The message specifies a method name and an argument list. When the object receives the message, code associated with the named method is executed with the formal parameters of the method bound to the corresponding values in the argument list. Methods and message passing in OOP are analogous to procedures and procedure calls in procedure-oriented software environments.

However, while procedures operate to modify and return passed parameters, methods operate to modify the internal state of the associated objects (by modifying the data contained therein). The combination of data and methods in objects is called encapsulation. Encapsulation provides for the state of an object to only be changed by well-defined methods associated with the object. When the behavior of an object is confined to such well-defined locations and interfaces, changes (e.g., code modifications) in the object will have minimal impact on the other objects and elements in the system.

Each object is an instance of some class. A class includes a set of data attributes plus a set of allowable operations (e.g., methods) on the data attributes. As mentioned above, OOP supports inheritance—a class (called a subclass) may be derived from another class (called a base class, parent class, etc.), where the subclass inherits the data attributes and methods of the base class. The subclass may specialize the base class by adding code which overrides the data and/or methods of the base class, or which adds new data attributes and methods. Thus, inheritance represents a mechanism by which abstractions are made increasingly concrete as subclasses are created for greater levels of specialization.

The present invention can employ abstract classes, which are designs of sets of objects that collaborate to carry out a set of responsibilities. Frameworks are essentially groups of interconnected objects and classes that provide a prefabricated structure for a working application. It should also be appreciated that the test executive kernel 12 and the test system interface component 12 could be implemented utilizing hardware and/or software, and all such variations are intended to fall within the appended claims included herein.

Figure 2A:
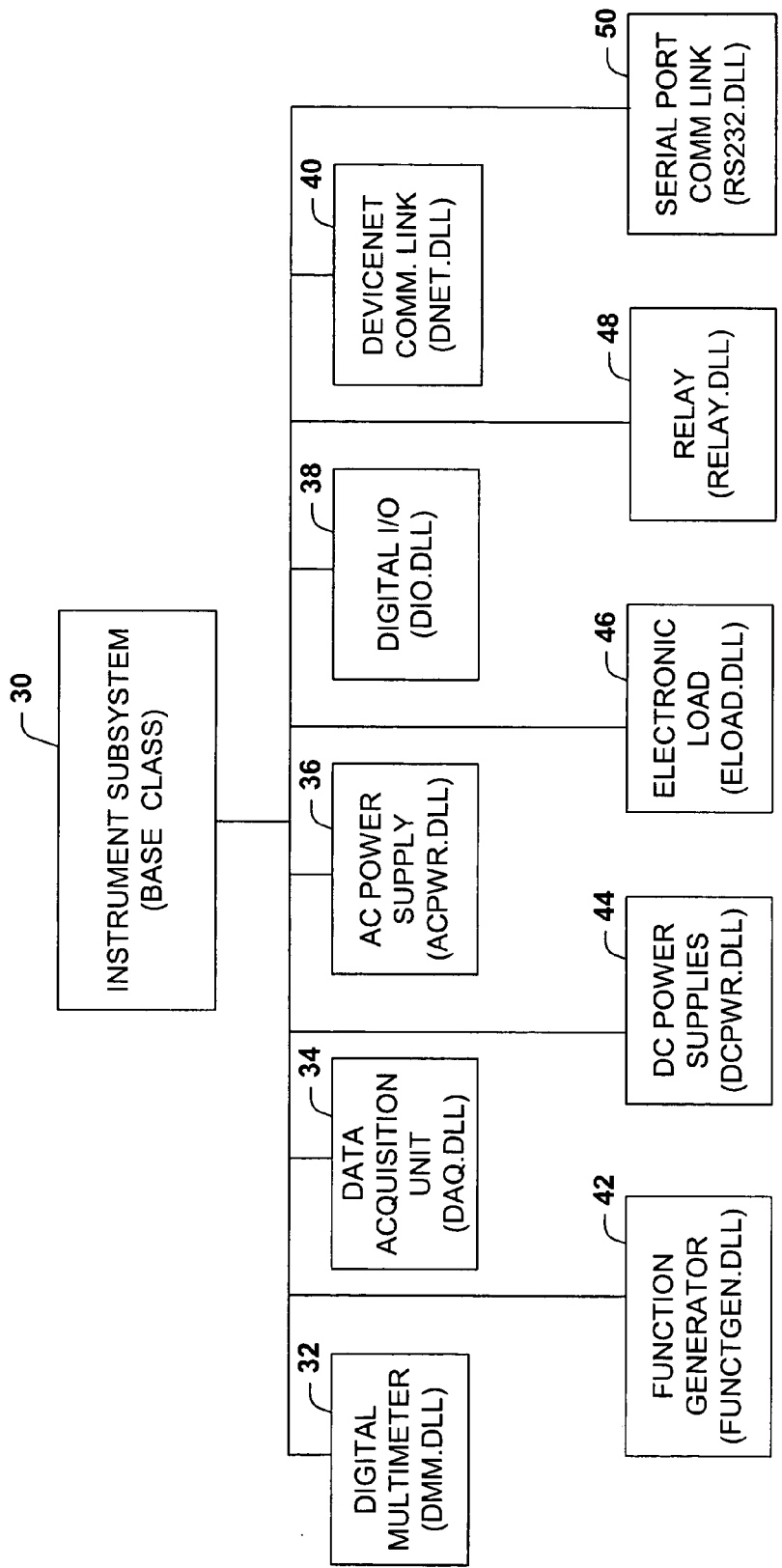
FIG. 2a illustrates a block diagram of an instrument subsystem in accordance with one aspect of the present invention.

Each instrumentation component can be written as a separate dynamic link library (DLL) that is part of a base class of an instrument subsystem. Each DLL includes several components that form the basic functionality (e.g., reset, self test, setup and read components) associated with that type of instrument. This allows for easy removal and replacement of out of date or obsolete instruments with minimal modifications to the DLL associated with that particular instrument type without effecting each product test. FIG. 2a illustrates an instrument subsystem 30 referred to as an instrument base class having a plurality of DLLs associated with the operation of particular instrument types. An example of possible instrument types are illustrated in FIG. 2a and include the following types (and DLLs): digital multimeter 32 (DMM.DLL), data acquisition unit 34 (DAQ.DLL), AC power supply 36 (ACPWR.DLL), digital I/O 38 (DIO.DLL), DeviceNet communication link 40 (DNET.DLL), function generator 42 (FUNCTGEN.DLL), DC power supplies 44 (DCPWR.DLL), electronic load 46 (ELOAD.DLL), relay 48 (RELAY.DLL) and serial port communication link 50 (RS232.DLL). It is to be appreciated that the above device types and DLLs are only exemplary and other device types and DLLs may be provided based on the associated products to be tested (e.g., printer, other communication links). Each instrument type can include a predefined public interface and be developed as a class library. This modular approach addresses the hardware obsolescence issue seen on other test architectures. An instrument can be replace with another without effecting the individual test programs that use it.

In a preferred aspect of the invention, each instrument type supports virtual mode. This allows the ability for a test program to run in simulation mode. Each instrument obtains its operating parameters from an initialization file and each instrument class library preferably supports a reset and self-test function. As the name implies, the reset function will reset the instrument to its power on state. The selftest function will instruct the instrument to perform its internal selftest. Each instrument DLL has code incorporated into components of the DLL that allow for tests to be operated in either virtual mode or live mode. FIG. 2b illustrates a portion of code 60 associated with a digital multimeter DLL. The portion of code 60 includes code 62 that sets and returns variables, while employing the DLL during virtual mode. This allows a test developer to develop tests at a remote location uncoupled to a test system (e.g., desktop personal computer) employing the test executive software system 10, while still receiving results that the developer would receive if operating the test on the test system with live instruments. Therefore, several developers can develop, run and debug tests without a test system and be confident that the test will run on the test system without any major problems.

The test executive software system 10 supports two modes of operation, simulation and normal mode. The normal mode of operation is that which is used to actually test products on the system. In this mode, all of the equipment required to test a product should be installed and operational in the test system. The simulation mode is used when a developer wants to develop code without needing a test system. This mode allows a developer to write, compile, and debug program logic. The following section defines how a system is configured to operate in these two modes. First, to define whether or not the system is operating in simulation mode, an environmental variable, "Simulation" is set to true on the system running the test executive software system 10. If this environmental variable is set to true, the test executive software system 10 will run in simulation mode. If this environmental variable is set to false or not defined, then the test executive software system 10 will run in normal mode. Next, the instruments need to be setup to operate in virtual mode or normal mode. This is accomplished by setting a "Live" parameter associated with each instrument in an instrument.ini initialization file residing on the system where the test executive software system 10 is to be executed. If the "Live" parameter is set to 1 for the instrument in this file, the instrument is to operate in normal mode. If the "Live" parameter is set to 0 for the instrument, it is to operate in virtual mode. Below is an example of the settings of the digital multimeter in an instrument.ini file defined to operate in virtual mode.

[DMM_1]
TYPE=DMM
PRIMARY_ADDRESS=22
LIVE=0

Figure 3:
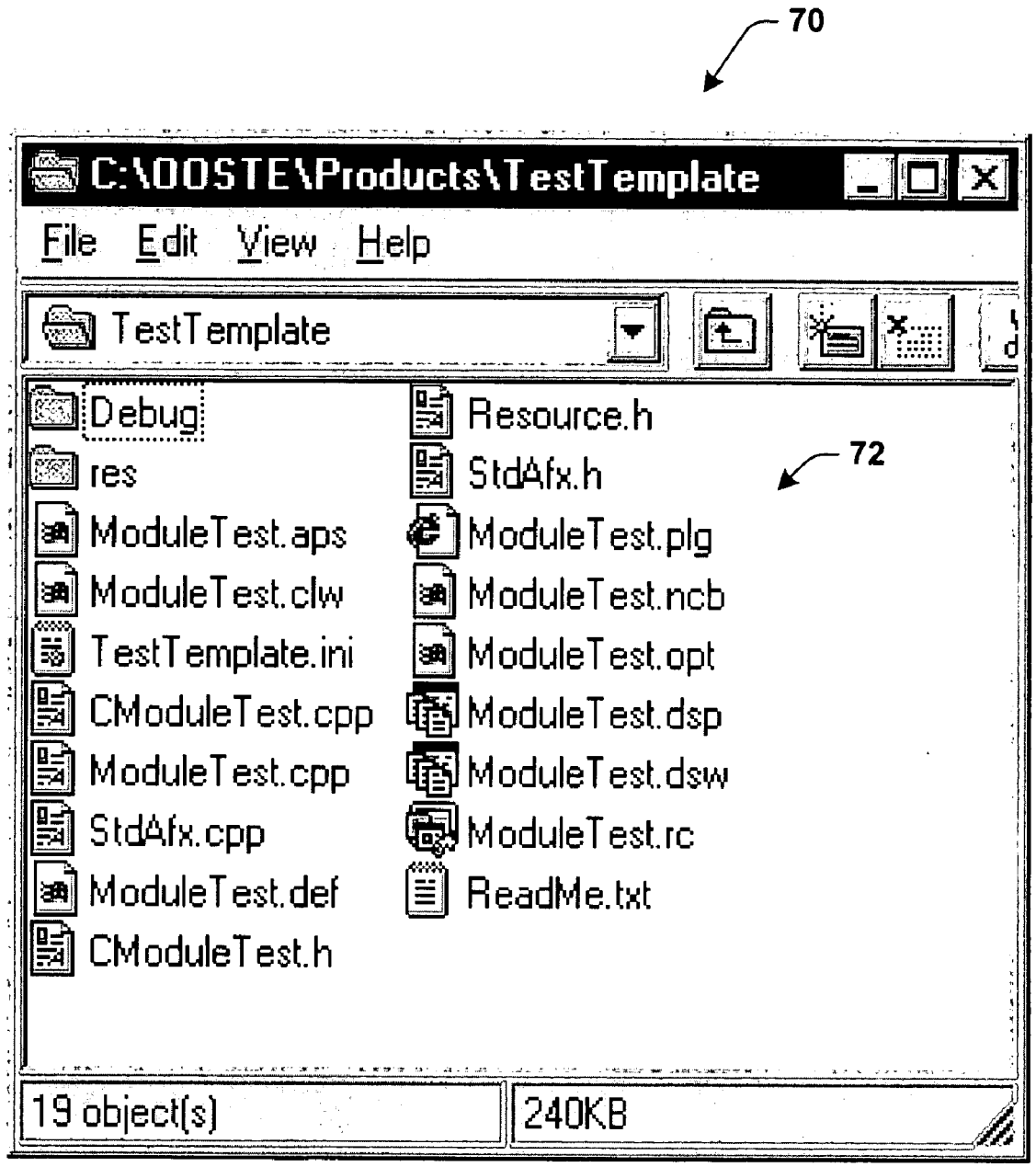
FIG. 3 illustrates a pop up window for a test template project folder in accordance with one aspect of the present invention.

FIG. 3 illustrates a pop-up box 70 having a test template project folder 72. In the example of FIG. 3, the test template project folder 72 is a Microsoft Visual C++(MSVC++) project template employed to simplify the test development process. The test development language of the example is "C/C++". The IDE (Integrated Development Environment) chosen to debug and compile the tests is "Microsoft Visual C++6.0". In an effort to make the test development process as simple as possible, a MSVC++ project template was created. This test template project folder already contains the correct project settings to create the test DLL (Dynamic Link Library). The test developer does not need to worry about creating the correct project type, setting up the required paths for such things as include files and library files, and many other details contained within the project settings.

The only files a test developer needs to modify for testing a particular UUT are the test template files CmoduleTest.h, CmoduleTest.cpp, and TestTemplate.ini. Furthermore, through use of the "#error preprocessor directive", a test developer is directed to areas of the test template files that require attention. This ensures consistency between test programs as well as minimizing the programming errors. After successfully compiling and debugging a test, the finished DLL is moved to where all test DLL's reside. The test will automatically appear as a selectable item in a graphical user interface.

Figure 4:
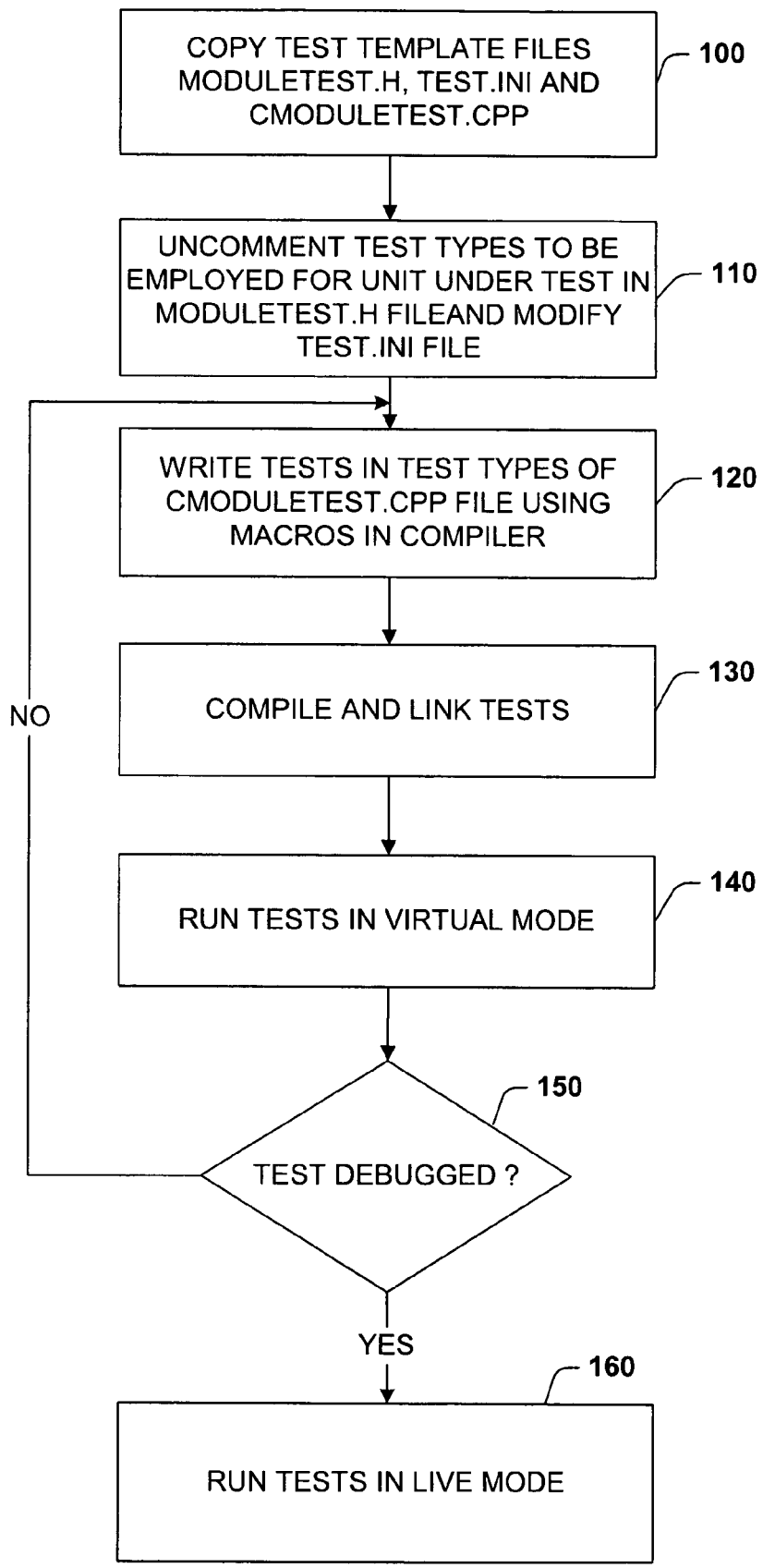
FIG. 4 is a flow diagram illustrating one particular methodology for developing a test programs in accordance with one aspect of the present invention.

FIG. 4 is a flow diagram illustrating one particular methodology for developing a test employing the test executive software system of the present invention. In step 100, a test developer copies the test template files moduletest.h, test.ini and Cmoduletest.cpp into a directory. In step 110, the test developer uncomments test level types to be employed for the unit under test in the test template moduletest.h file and modifies the test template test.ini file to include those test level types. In step 120, the test developer writes tests in the functions of the test level types of the test template Cmoduletest.cpp file using macros in the compiler. The test developer then compiles and links the tests in step 130. The tests are then run in virtual mode in step 140 to verify and debug the tests. In step 150, it is determined if the tests have been debugged. If the tests have been debugged (YES), the tests are run in live mode in step 160. If the tests have not been debugged (NO), the developer returns to step 120 to modify the tests until the tests have been debugged.

FIG. 5a illustrates an exemplary test template moduletest.h file 200 having a plurality of system include files 202. The test template moduletest.h file also includes a class CmoduleTest 204 having a plurality of function calls 206 reflecting the different test level types to be employed in the testing of a UUT. A test developer can simply uncomment the test level types to be employed in the test and add any necessary private and protected data members and functions to the test template moduletest.h file. FIG. 5b illustrates a portion of an exemplary test template Cmoduletest.cpp file 210 having a plurality of test level type functions 212. A developer can simply write their tests within the test level type function for testing the particular UUT that the test is being developed for functionally verifying. It is to be appreciated that the moduletest.h file and the Cmoduletest.cpp file could be combined into a single test template file if so desired.

An example of available test level types can be as follows: ambient, burn-in, cycle ambient, cycle hot, cycle hot ambient, dynamic hot, dynamic hot sampling, dynamic hot sampling audit, hipot, preheated hot, alignment, download, calibration, troubleshooting, cable, final, functional module and functional system. Each of the above test level types is a section within the "test.ini" file and contains the following entries: ENABLE_LEVEL; set equal to 1 if the test level type is to appear in the test level selection box of the GUI, QIS; set equal to 1 if QIS data used for Statistical Process Control is to be automatically retrieved and uploaded to a QIS server, WIN; set equal to 1 if the test operator is to be prompted to enter the WIN (Warrantee Information Number), ASA; set equal to 1 if the test operator is to be prompted to enter the ASA number (module serial number), DATALOGGING; set equal to 1 if the local history files are to be generated and FIXTURE_ID; enter the fixture ID required by this product.

Figure 6A:
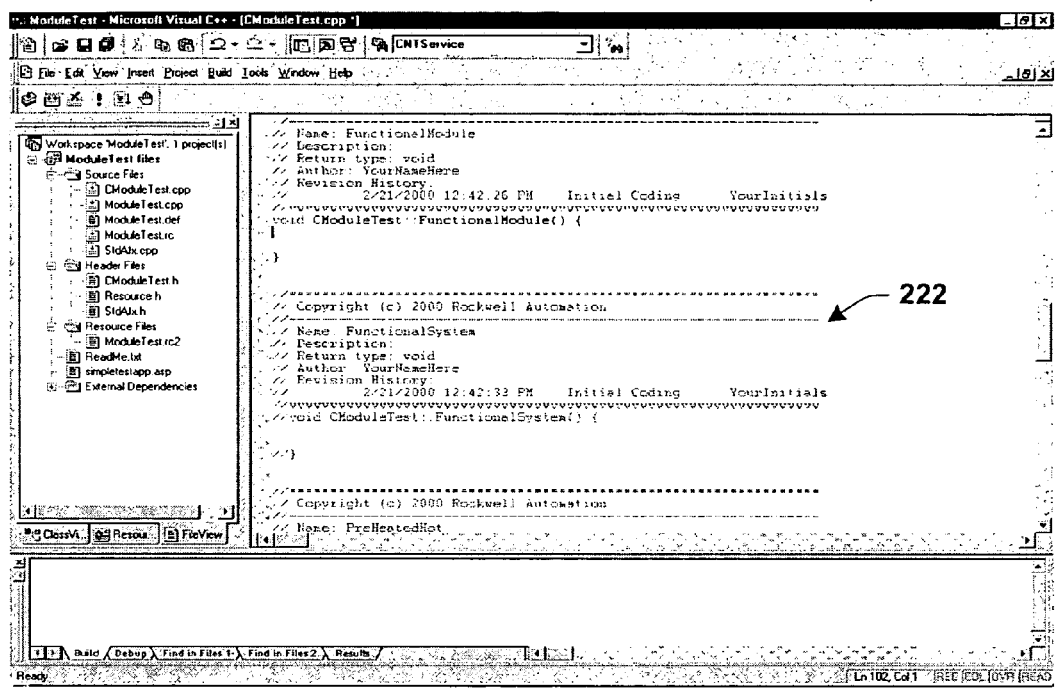
FIG. 6a illustrates a test project development screen with a test template file disposed in an editable area in accordance with one aspect of the present invention.
Figure 6B:
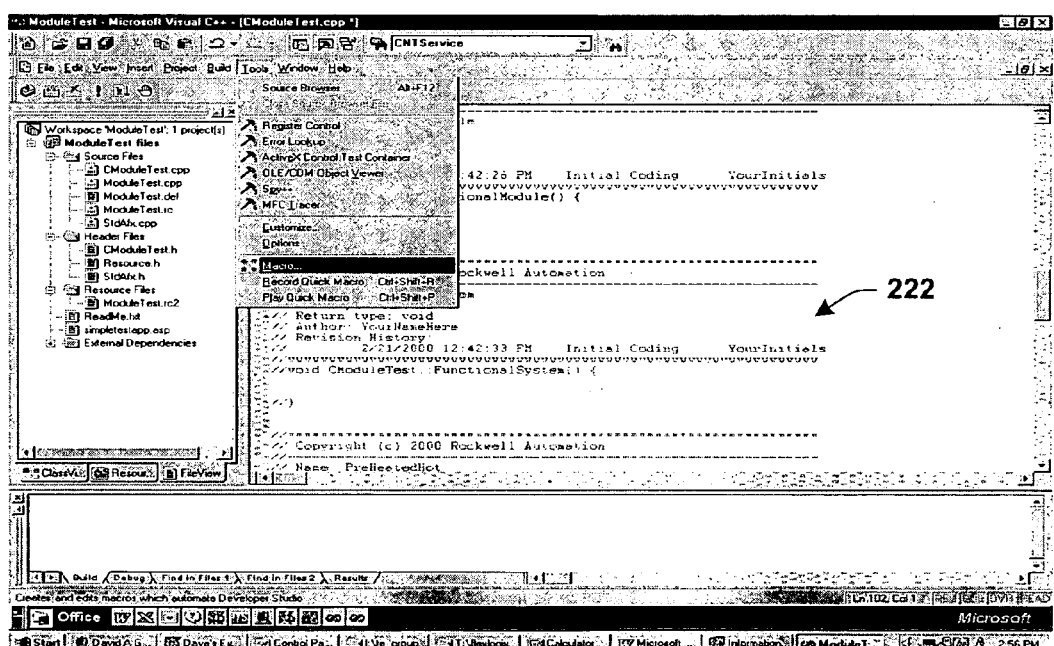
FIG. 6b illustrates invocation of a Macro function in the Tools menu of the test project development screen of FIG. 6a in accordance with one aspect of the present invention.
Figure 6C:
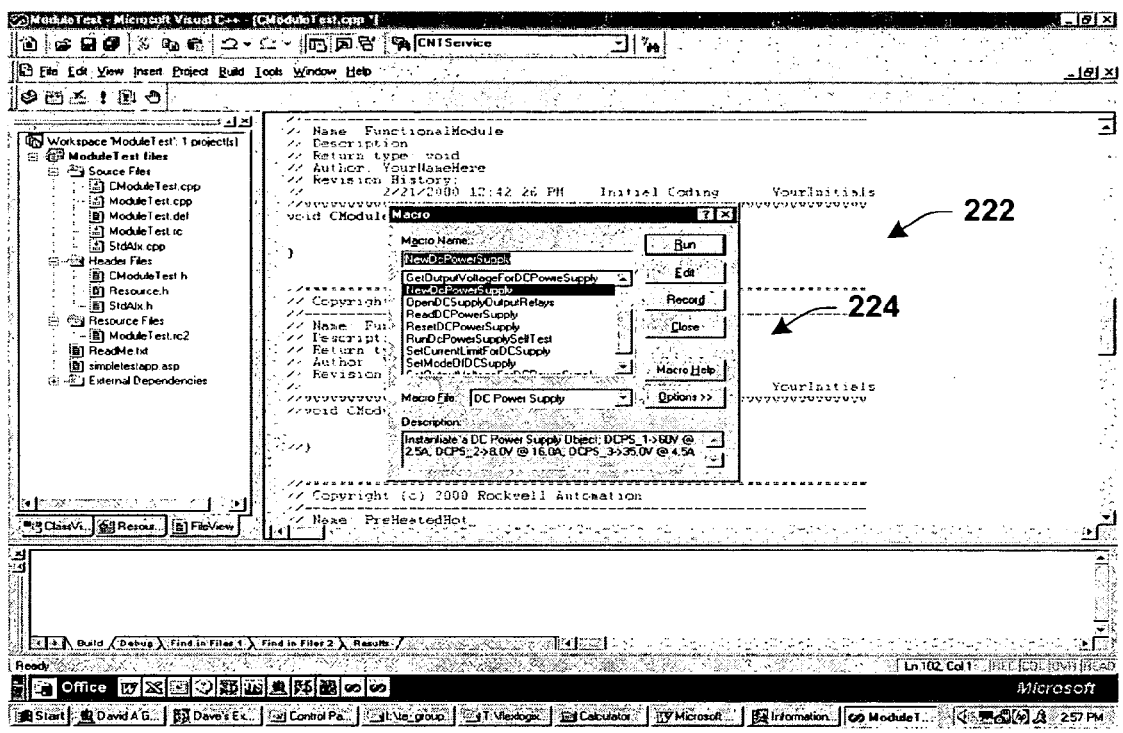
FIG. 6c illustrates a Macro function pop-up menu displayed from invocation of the Macro function in the test development screen of FIG. 6b in accordance with one aspect of the present invention.
Figure 6D:
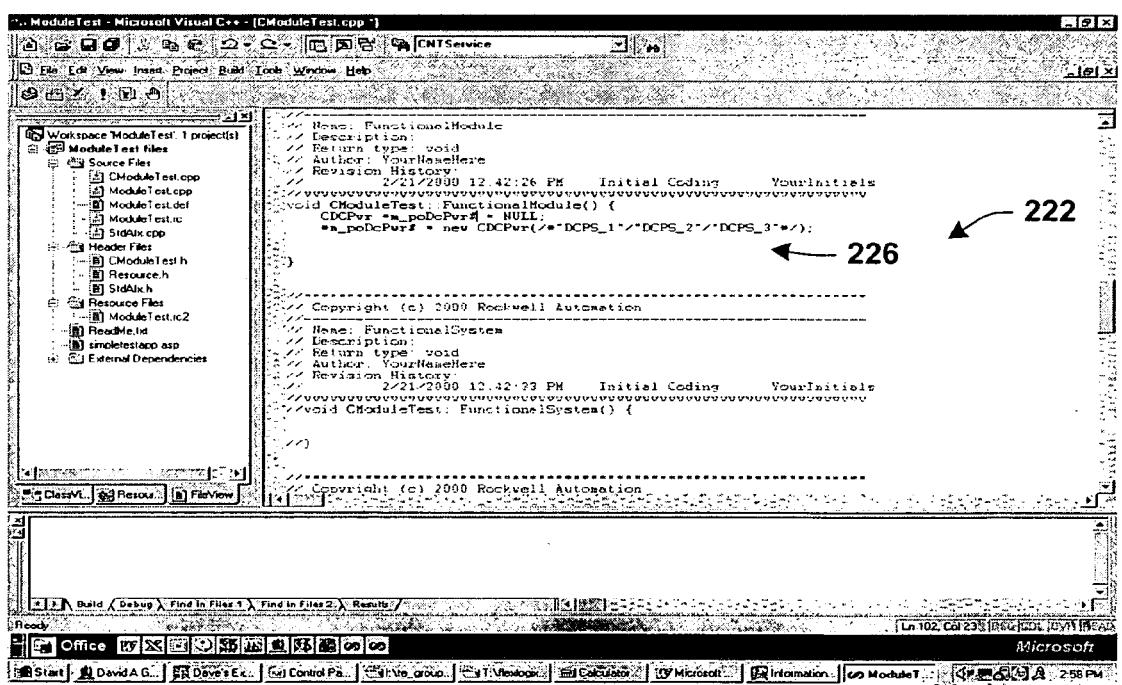
FIG. 6d illustrates insertion of code in a function of the test template file by selection of one of the Macros displayed in the Macro function pop-up menu of FIG. 6d in accordance with one aspect of the present invention.

The present invention provides for simplification of the development process by employing macros containing code used in testing UUTs. An example of a list of possible macros is contained within an appendix attached to the end of this specification. FIGS. 6a–6d illustrate an example of the steps employed to utilize the macros of the present invention to develop tests. FIG. 6a illustrate a screen employing Microsoft Visual C++ with a test template Cmoduletest.cpp file 222 displayed in a window 220. A test developer simply places a cursor (e.g., utilizing a mouse pointer) in the respective test level type function uncommented in the test template moduletest.h file. The test developer will then select the Macro option in the Tools menu as illustrated in FIG. 6b. A Macro selection menu 224 will then be displayed to allow a developer to select between a list of macros as illustrated in FIG. 6c. The test developer will then select a macro from the Macro selection menu and click on the "Run" box to insert a portion of test code 226 into the test level type function as illustrated in FIG. 6d. The test developer can continue this process until a complete test has been developed. Additional code can be typed into the test level type function to customize the test.

FIGS. 7a–7b illustrates an exemplary test template moduletest.h file 250 and a portion of a test template Cmoduletest.cpp file 270 for performing a simple measurement with a digital multimeter according to the present invention. Referring initially to FIG. 7a, the functions FunctionalModule() and Initialize System() in the test template moduletest.h file have been uncommented out of a section of a plurality of test level types 252. Additionally, the variable definitions 254 of the instruments for the digital multimeter, the first and third DC power supply, the relays and the digital I/O have been commented out for the plurality of instrument to be used in the test. A simplified test written in C++ is shown in the Functional module test type of a portion of the test template Cmodule.cpp file 270 illustrated in FIG. 7b. The test utilizes relays to connect the DC power supply to the digital multimeter and to verify that the DC power supply has been programmed to a specified voltage.

Figure 8:
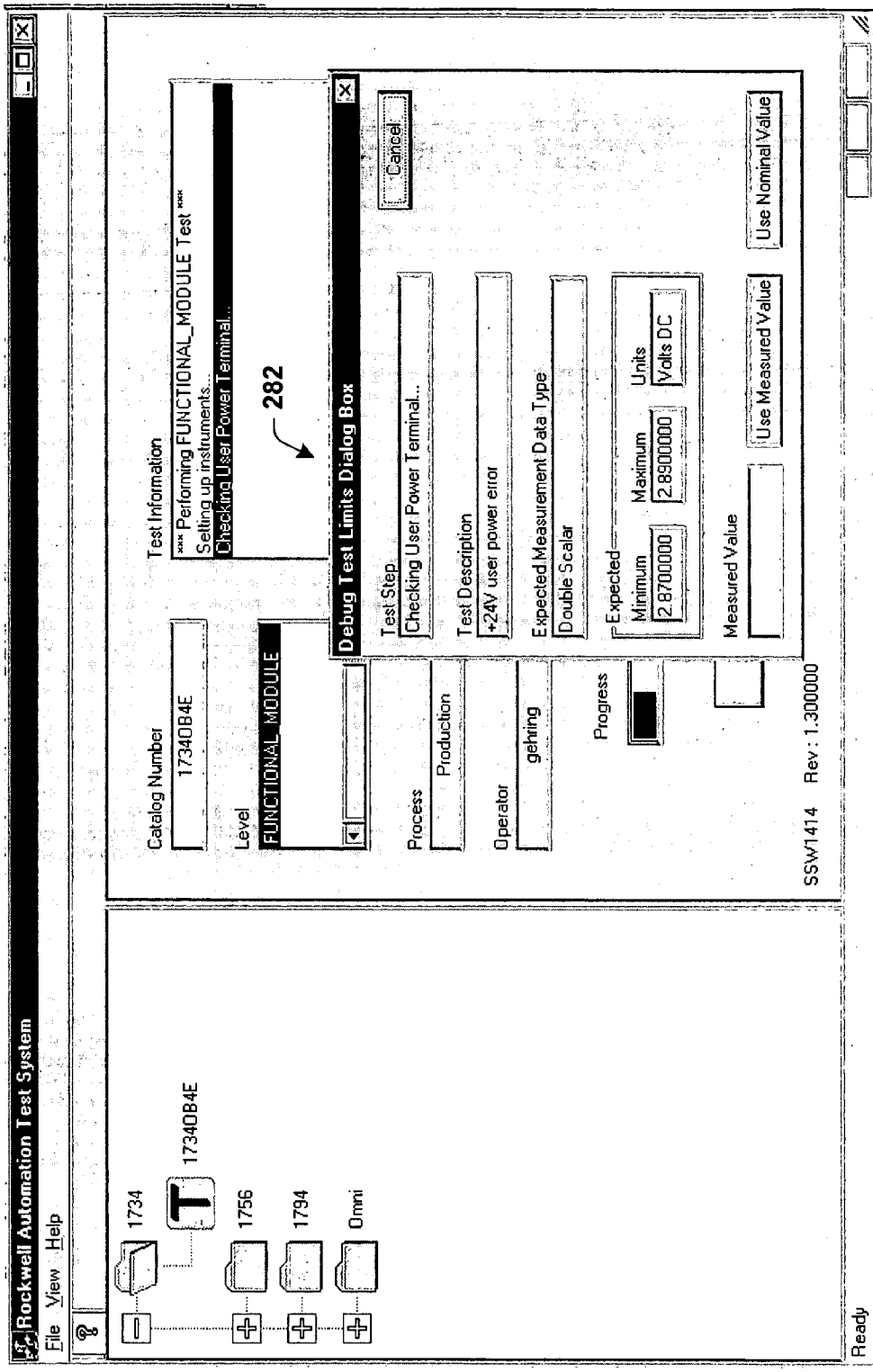
FIG. 8 illustrates a graphical user interface window with an example of a dialog box that is displayed when operating in simulation mode in accordance with one aspect of the present invention.

As previously stated, the test executive software system allows the test to run on a desktop PC without the actual test hardware (e.g., instruments) by operating in simulation mode. This allows the test developer to write, compile, and debug program logic before actually needing a test system. This reduces capital expenditures and increases the overall productivity of the test developers. If the test system is operating in simulation mode and all of the instruments are operating in virtual mode, a dialog box 282 illustrated in FIG. 8, is displayed over a graphical user interface window 280, to the user when running their test. The dialog box 282 is displayed anytime the test program tries to verify a value. The dialog box contains the following information; Test Step, Test Description, Expected Measurement Data Type and Expected (Min, Max and Units). If the user selects the "Use Nominal Value" button, the simulated measured value will be the nominal value. If the "Use Measured Value" button is selected, the value entered in the "Measured Value" edit control box is used as the simulated measured value.

Figure 9A:
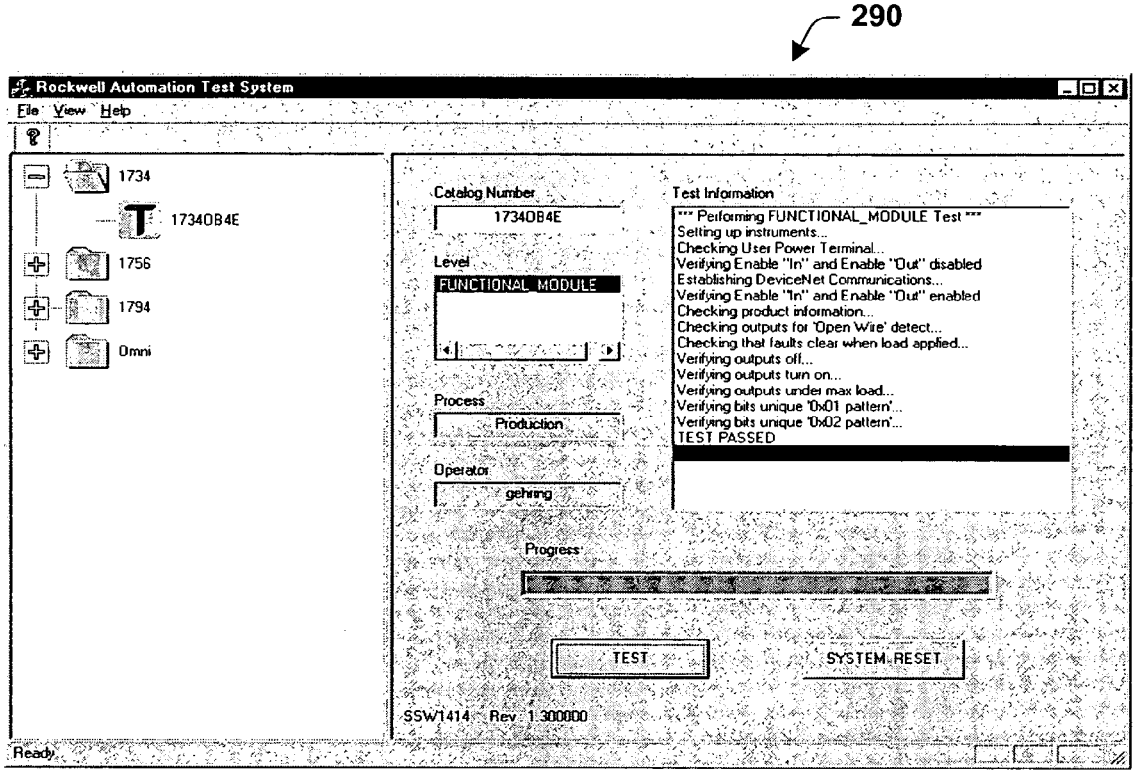
FIG. 9a illustrates a graphical user interface window as seen by a test operator when a UUT passes a test in accordance with one aspect of the present invention.
Figure 9B:
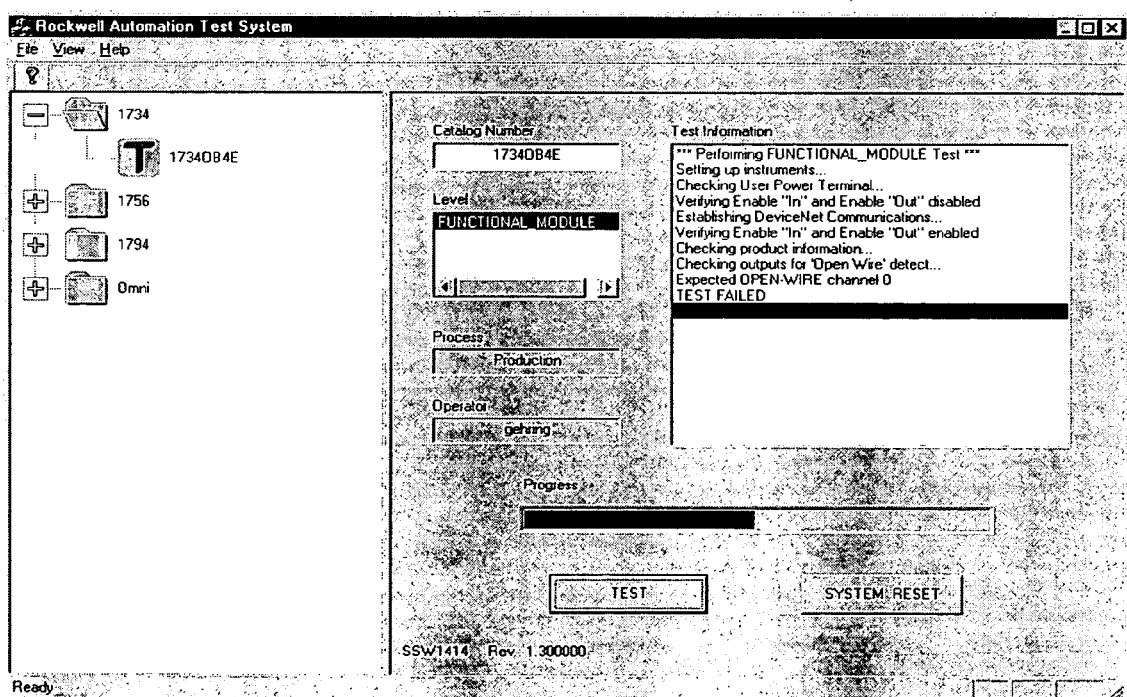
FIG. 9b illustrates a graphical user interface window as seen by a test operator when a UUT fails a test in accordance with one aspect of the present invention.

FIG. 9a illustrates a graphical user interface window 290 as seen by a test operator. In order to perform a test, the operator selects a product from the tree control on the left side of the screen. In FIG. 9a, the product family selected is the 1734 product line and the catalog number selected is the 1734OB4E. Now, the test library is loaded and catalog number, test level, process, and operator controls are updated to reflect the current product being tested. When the operator selects one or more test levels from the level list control and then presses the "TEST" button, the product test begins to execute. If the product successfully passes its tests, the result will resemble FIG. 9a. The progress bar changes its color from BLUE to GREEN indicating that the test has passed. If the product failed one of its test steps, the result is illustrated in FIG. 9b. The progress bar changes its color from BLUE to RED indicating the test failed, the test system executive software then terminates the test. Optionally, the test executive software can display and/or print the failure information.

Figure 10:
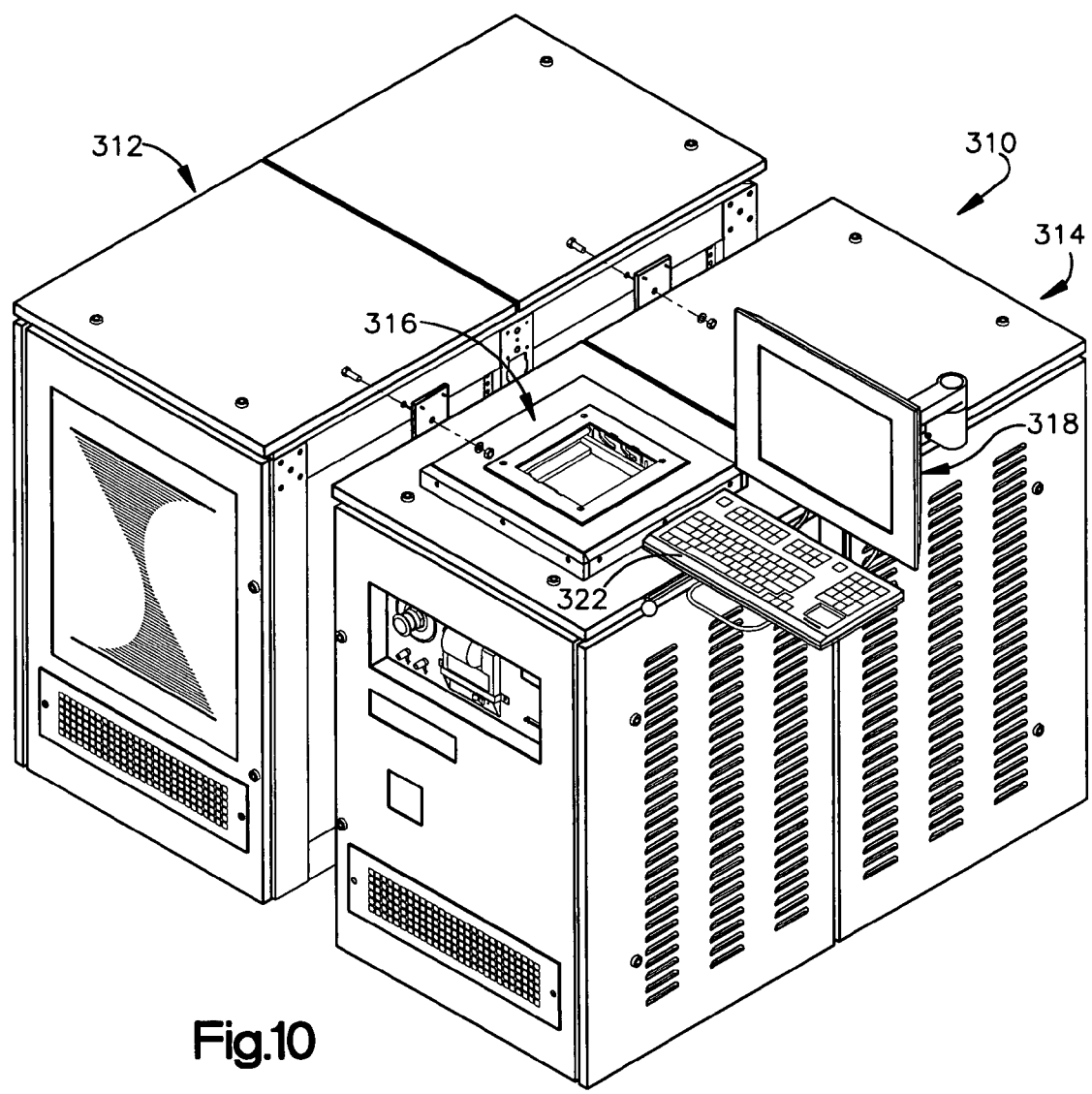
FIG. 10 illustrates a perspective view of a test system in accordance with one aspect of the present invention.

Referring now to FIG. 10, a test system 310 illustrating an environment of the present invention is shown. The test system 310 has an instrument bay 312 and a test bay 314. A tester interface panel 316 resides on top of the test bay 314. The tester interface panel 316 is adapted to receive and mate with a test fixture interface panel for testing industrial control modules of various product families and product types having different functional capabilities. A computer display 318 and a computer keyboard 322 are coupled to the test bay 314 and provide user interface capabilities to the test system 310.

Figure 11:
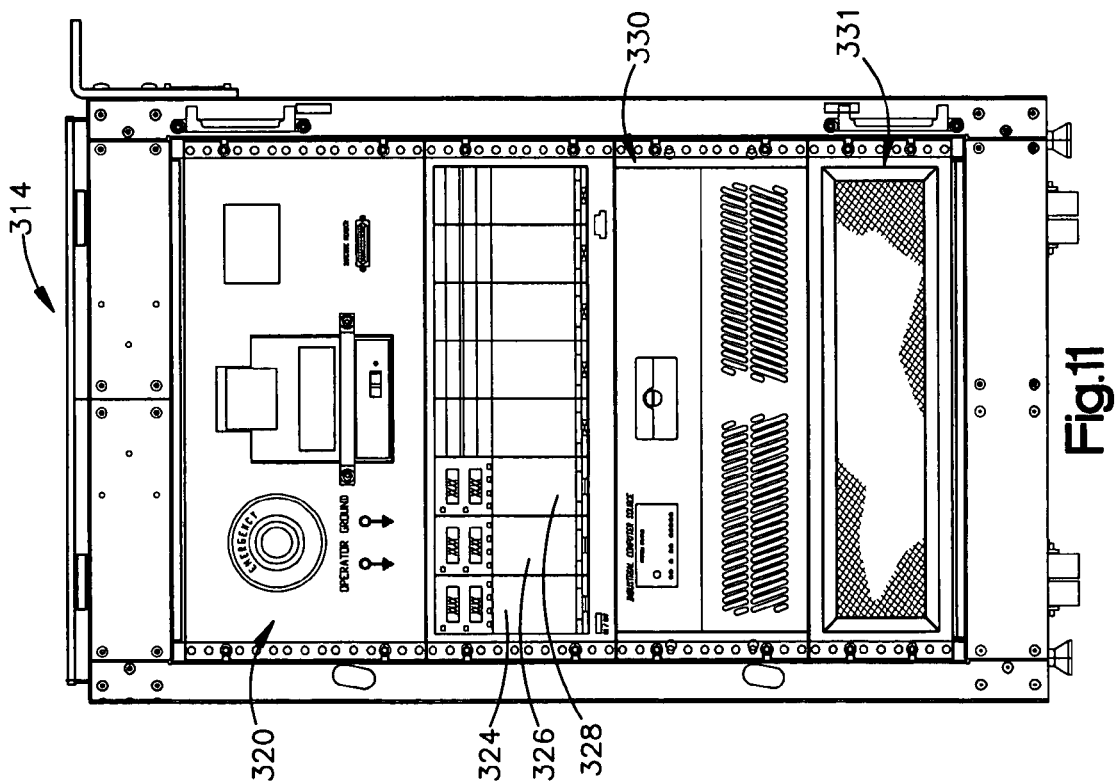
FIG. 11 illustrates a front view of a test bay of the test system of FIG. 10 in accordance with one aspect of the present invention.

FIG. 11 provides a more detailed description of the test bay 314. The test bay 314 includes an operator panel 320. The operator panel 320 includes components such as an emergency stop button, a printer, a barcode reader port, an operator connection and a ground connection. It is to be appreciated that various other operator interface components can be provided on the operator panel 320. The test bay 314 also includes DC power supplies 324, 326 and 328. The DC power supplies 324, 326 and 328 provide power for powering up industrial control modules under test (hereinafter referred to as unit under test (UUT). The DC power supplies can also provide DC power for UUTs that utilize DC voltage as an input signal (e.g., DC input modules). The test bay 314 also includes a computer 330 coupled to the display 318 and the keyboard 322. The computer 330 can be programmed to provide a variety of different communication protocols utilized in testing different UUTs (e.g., RS-232, DeviceNet, ControlNet, USB). A blower 331 is provided in the test bay 314 to ensure that components within the test bay 314 remain cool during operation of the test system 310.

Figure 12:
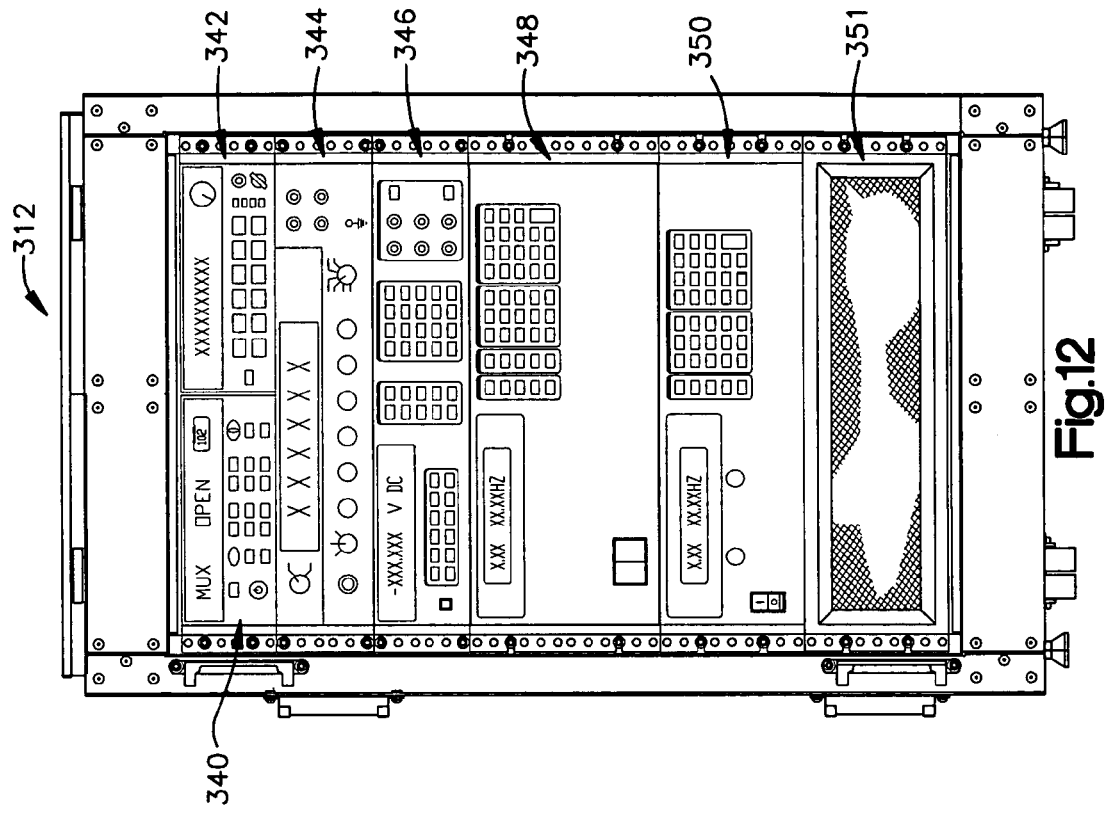
FIG. 12 illustrates a front view of an instrument bay of the test system of FIG. 10 in accordance with one aspect of the present invention.

FIG. 12 provides a more detailed description of the instrument bay 312. The instrument bay 312 includes instruments that provide measurements of UUT characteristics and parameters having a variety of differing functionalities. The instruments also provide input and output stimulus similar to the stimulus that the UUT will experience in its normal operational environment. The instrument bay 312 houses a data acquisition system (DAQ) 340, a waveform generator 342, a DC voltage calibration/simulator 344, a digital multimeter 346, an electronic load 348 and an AC power supply 350. A blower 351 is provided in the instrument bay 312 to ensure that the instruments within the instrument bay 312 remain cool during operation of the test system 310.

What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

APPENDIX

MACROS

Digital MultiMeter Macros

| | |
|---|---|
| AddDmm | This creates a new DMM object |
| RemoveDmm | This deletes a previosly instantiated DMM object |
| SetDmmMode | This sets the mode the DMM is to operate in |
| GetDmmMode | This gets the mode the DMM has been programmed to operate in |
| SetDmmRange | This sets the range the DMM is to operate in |
| GetRange | This gets the range the DMM has been programmed to |
| ReadDmm | This performs a reading from the DMM |
| ResetDmm | This resets the DMM |
| GetPointerToCommLink | Get a pointer to comm link that is used to control the DMM (This allows direct control over DMM. Typically not to be used, this could cause your code to not to be portable) |
| Selftest | This instructs the DMM to run its internal selftest |

Scanlist Macros

| | |
|---|---|
| AddEmptyScanList | This instantiates an EMPTY ScanList that can be used with the DAQ Unit |
| AddScanList | This instantiates a DEFINED ScanList that can be used with the DAQ Unit |
| RemoveScanList | This removes (deletes) a previously instantiated ScanList |
| SetScanListTriggerType | This defines the type of trigger to use to start the scan |
| GetScanListTriggerType | This returns the type of trigger currently being used to start a scan (This returns a value of type TRIGGER_TYPE) |
| SetNumberOfScans | This defines the number of scans that are to occur when a trigger is encountered |
| GetNumberOfScans | This returns the number of scans that are to occur when a trigger is encountered |
| GetNumberOfChannelsInScanList | This returns the total number of channels that are in the defined scan list |
| ChannelsToScan | This retruns the list of channels to scan. The list is returned through the piChannelList pointer (array) of length iChListLen. |
| GetScanListChannelData | This returns the data read back from a particular channel in the scan list. The channel is specified by the iChannel parameter and the data is returned through the pdChData pointer (array) of size iBufSize. |
| AddChannelToScanList | This function allows the ability to add a channel to an empty or defined Scan List |
| RemoveChannelFromScanList | This removes a channel from a defined scan list |
| SetScanListMode | This defines the operating mode for ALL of the channels in the scan list |
| GetScanListMode | This returns the operating mode for a channel in the scan list |
| SetScanListRange | This defines the range for ALL of the channels in the scan list |
| GetScanListRange | This returns the range for a channel in the scan list |
| SetScanListResolution | This defines the resolution for ALL of the channels in the scan list |
| GetScanListResolution | This returns the resolution for a channel in the scan list |
| SetScanListChannelDelay | This defines the delay between channel measurements for ALL channels in the Scan List |
| SetScanListAcFilter | This defines the AC filter to be used for ALL channels in the Scan List |
| GetScanListAcFilter | This returns the AC filter for a channel in the Scan List |
| SetScanLatency | |

File Utility Macros

| | |
|---|---|
| AddFunctionDescription ( ) | Creates a comment block for the currently selected C/C++ function prototype |
| AddStandardRevisionControlBlock ( ) | Adds comments to a file that describe the changes made. |
| CommentOutCodeBlock | Comments out a selected block of text. |
| OneTimeInclude | Adds code to the current header file so it is included only once per c/cpp file. |

Digital I/O Macros

| | |
|---|---|
| AddDigitalIoObject | Instantiate a Digital IO object |
| RemoveDigitalIoObject | Instantiate a Digital IO object |
| ReadBit | Read from a bit on a Digital IO Port (Return type is bool) |
| ReadGroup | Read a group of bits back from a Digital IO Port (data is returned via reference variable pusWord) |
| WriteBit | Write to a bit on a Digital IO Port |
| ResetAllDigitalIOPorts | Resets all Digital IO ports in the system |
| ResetDigitalIOGroup | Resets a selected Digital IO port in the system |

APPENDIX-continued

MACROS

Relay Macros

| | |
|---|---|
| AddRelay | This instantiates a Relay instrument object |
| RemoveRelay | This removes (deletes) a previously instantiated Relay object |
| OpenRelay | This opens up a relay in a particular relay group |
| OpenListOfRelays | This opens up all relays in a specified list of relays in a particular group |
| CloseRelay | This closes up a relay in a particular relay group |
| CloseListOfRelays | This closes up all relays in a specified list of relays in a particular group |
| GetStateOfRelayGroup | This returns the state (i.e.: Closed (False) or Opened (True)) of a list of relays in a particular group |
| GetStateOfARelay | This returns the state (i.e.: Closed (False) or Opened (True)) for a relay in a particular group |
| ResetAllRelays | This resets ALL relays in the system to thier default (de-energized) state |
| ResetRelayGroup | This resets ALL relays in a specified relay group, not the whole system |

Data Acquisition Macros

| | |
|---|---|
| AddDaq | This instantates a DAQ Instrument object |
| RemoveDaq | This removes (deletes) a previously instantiated DAQ Instrument object |
| ResetDaq | This issues a reset command to the DAQ in the system |
| DownloadScanList | This downloads a previously instantaited CScanList object to the DAQ |
| ReadDaq | This performs a read operation from the DAQ |
| PerformDaqSelfTest | This instructs the DAQ to perform its internal self test (This returns a value of type SELFTEST_RESULT) |

DC Power Supply Macros

| | |
|---|---|
| NewDcPowerSupply | Instantiate a DC Power Supply Object; DCPS_1−>60 V @ 2.5 A, DCPS_2−>8.0 V @ 16.0 A, DCPS_3−>35.0 V @ 4.5 A |
| DeleteDCPowerSupplyObject | Delete a previously instantiated DC Power Supply object |
| ResetDCPowerSupply | This issues a reset to the DC Power Supply pointed to by the m_poDcPwr# pointer |
| SetOutputVoltageForDCPowreSupply | This sets the output voltage for the DC Power Supply pointed to by the m_poDcPwr# pointer |
| GetOutputVoltageForDCPowreSupply | This gets the output voltage that the DC Power Supply point to by the m_poDcPwr# pointer has been programmed to |
| ReadDCPowerSupply | This performs a reading from the DC Power Supply pointed to by the m_poDcPwr# pointer. You can read either CURRENT or VOLTAGE back from the supply (This returns a double) |
| SetCurrentLimitForDCSupply | This sets the current limit the DC Power Supply pointed to by the m_poDcPwr# pointer |
| GetCurrentLimitForDCSupply | This gets the current limit the DC Power Supply pointed to by the m_poDcPwr# pointer has been set to |
| SetModeOfDCSupply | This sets the mode the DC Power Supply pointed to by the m_poDcPwr# pointer is to operate as |
| GetModeOfDCSupply | This gets the operating mode the DC Power Supply pointed to by the m_poDcPwr# pointer has been programmed to (Return type is OP_MODE) |
| OpenDCSupplyOutputRelays | This opens the output relays for the DC Power Supply pointed to by the m_poDcPwr# pointer |
| CloseDCSupplyOutputRelays | This closes the output relays for the DC Power Supply pointed to by the m_poDcPwr# pointer |
| RunDcPowerSupplySelfTest | This instructs the DC Power Supply pointed to by the m_poDcPwr# pointer to run its internal self test |

AC Power Supply Macros

| | |
|---|---|
| NewACPowerSupply | This instantiates an AC Power Supply object used to control the systems AC Power Supply. |
| DeleteACPowerSupply | This removes a previously instantiated AC Power Supply object |
| ReadAcPowerSupply | This performs a read operation from the AC power supply, you can read current, voltage, and power. (The return type is a double). |
| ResetAcPowerSupply | This performs a reset operation to the AC Power Supply. |
| SetModeOfACPowerSupply | This sets the mode of operation that the AC Power Supply is to operate in. |
| GetModeOfACPowerSupply | This function returns the current operating mode the AC Power Supply is operating in (The return type is OP_MODE). |
| SetOutputValueOfACPowerSupply | This sets the output voltage, in Volts AC. |
| GetOutputValueOfACPowerSupply | This gets the output voltage the AC Power Supply has been programmed to (This returns a double). |
| SetDcOffsetValueOfACPowerSupply | This programs the DC offset component for the AC power supply. |

APPENDIX-continued

MACROS

| | |
|---|---|
| GetDcOffsetValueOfACPowerSupply | This gets the DC offset voltage that the AC Power Supply has been programmed to (This returns a double). |
| SetCurrentLimitOfACPowerSupply | This sets the output current limit for the AC Power Supply. |
| GetCurrentLimitOfACPowerSupply | This gets the output current limit that the AC Power Supply has been set to (This returns a double). |
| SetOverVoltageLimitForACPowerSupply | This sets the overvoltage limit the AC Power Supply is to operate at. |
| GetOverVoltageLimitForACPowerSupply | This gets the overvoltage limit the AC Power Supply has been set to operate at (This returns a double). |
| SetOutputFrequencyOfACPowerSupply | This sets the output frequency of the AC Power Supply. |
| GetOutputFrequencyOfACPowerSupply | This returns the output frequency the AC Power Supply has been programmed to. |
| OpenAcPowerSupplyOutputRelay | This opens the output relay on the AC Power Supply. |
| CloseAcPowerSupplyOutputRelay | This closes the output relay on the AC Power Supply. |
| ACPowerSupplySelfTest | This performs the built in selftest for the AC Power Supply ( This returns a datatype of SELFTEST_RESULTS). |
| Electronic Load Macros | |
| AddElectronicLoad | This instantiates a new Electronic Load instrument object |
| RemoveElectronicLoad | This removes (deletes) a previously instantiated Electronic Load object |
| ResetElectronicLoad | This issues a reset (*RST) operation to the Electronic Load |
| SetModeForElectronicLoad | This sets the mode the Electronic Load is to operate in |
| GetModeForElectronicLoad | This returns the operating mode the Electronic Load has been programmed to (This returns an ELOAD_MODE value) |
| SetRangeForElectronicLoad | This sets the range the Electronic Load is to operate in |
| GetRangeOfElectronicLoad | This returns the range the Electronic Load has been programmed to |
| ReadElectronicLoad | This performs a reading from the Electronic Load, either current or voltage. |
| SetLoadValue | This sets the load that the unit is to operate at |
| GetLoadValue | This returns the load that the unit has been programmed to operate at (Return type is a double) |
| PerformElectronicLoadSelfTest | This instructs the electronic load to perform its internal self test (This returns a value of type SELFTEST_RESULTS) |
| Function Generator Macros | |
| AddFunctionGenerator | This instantiates a Function Generator Instrument Object |
| RemoveFunctionGenerator | This removes (deletes) a previously instantiated a Function Generator Instrument Object |
| RunFunctionGeneratorSelfTest | This instructs the Function Generator to run its internal selftest (This returns a value of type SELFTEST_RESULT) |
| ResetFunctionGenerator | This instructs the Function Generator to perform its reset sequence |
| DefineWaveform | This defines a waveform in one function call |
| SetupFunctionGeneratorPulse | This defines a pulse train in one function call |
| IssueTriggerEventToFuntionGenerator | This issues a trigger event to the Function Generator |
| SetFunctionGeneratorFrequency | This defines the frequency of the waveform created by the Function Generator |
| SetFunctionGeneratorAmplitude | This defines the amplitude of the waveform created by the Function Generator |
| SetFunctionGeneratorOutputImpedence | This defines the output impedance of the Function Generator |
| SetWaveformType | This defines the waveform shape of the waveform created by the Function Generator |
| SetFunctionGeneratorTimeout | This defines the allowable time out the Function Generator is to operate |
| SetFunctionGeneratorTriggerType | This defines the type of trigger the function generator is to use to generate the waveform/pulse train |
| SetFunctionGeneratorDcOffset | This defines the DC offset for the waveform/pulse train created by the Function Generator |
| SetFunctionGeneratorBurstCount | This defines the number of cycles that will be generated for a burst |
| SetFunctionGeneratorPhase | This defines the starting phase for a waveform (0 to 360 degrees) |
| SetFunctionGeneratorBurstMode | This defines if BURST MODE is turned on (TRUE) or off (FALSE) |
| SetFunctionGeneratorSyncMode | This defines if SYNC MODE is turned on (TRUE) or off (FALSE) |
| SetFunctionGeneratorDutyCycle | This defines a the duty cycle for a SQUARE WAVE |

APPENDIX-continued

MACROS

| | |
|---|---|
| GetFunctionGeneratorFrequency | This returns the frequency that the Function Generator has been programmed to (This returns a double) |
| GetFunctionGeneratorAmplitude | This returns the amplitude that the Function Generator has been programmed to (rdVoltage is a reference to a double variable and reVoltUnits is a reference to an enumerated variable) |
| GetFunctionGeneratorOutputImpedence | This returns the output impedance that the Function Generator has been programmed to (It returns an enumerated value of type OUTPUT_IMPEDENCE) |
| GetWaveformType | This returns the waveform type (shape) that the Function Generator has been programmed to generate (It returns an enumerated value of type WF_TYPE) |
| GetFunctionGeneratorTimeout | This returns the timeout value that the Function Generator has been programmed to operate at (This returns an unsigned long value) |
| GetFunctionGeneratorTriggerType | This returns the trigger type that the Function Generator has been programmed to use to generate a trigger event (This returns an enumerated value of type WF_TRIGGER) |
| GetFunctionGeneratorDcOffset | This returns the DC offset of the Waveform/Pulse Train the Function Generator is generating (This returns a double value) |
| GetFunctionGeneratorBurstCount | This returns the BURST count value that the Function Generator has been programmed to (This returns an unsigned long value) |
| GetFunctionGeneratorPhase | This returns the staring phase that the Function Generator has been programmed to use for Waveform/Pulse Train generator ( This returns a short value) |
| GetFunctionGeneratorBurstMode | This returns a boolean indicating whether or not the Function Generator is operating in BURST MODE |
| GetFunctionGeneratorSyncMode | This returns a boolean indicating whether or not the Function Generator is operating in SYNC MODE |
| GetFunctionGeneratorDutyCycle | This returns the DUTY CYCLE that the Function Generator has been programmed to use for generating SQUAREWAVE (This returns a double value) |
| Precision Source Macros | |
| AddPrecisionSource | This instantiates a new Precision Source instrument object |
| RemovePrecisionSource | This removes (deletes) a previously instantiated Precision Source object |
| ResetPrecisionSource | This issues a reset command to the precision source |
| SetPrecsionSourceRange | This sets the range the Precision Source is to operate at. |
| GetPrecsionSourceRange | This returns the range the Precision Source is programmed to operate at. |
| SetPrecisionSourceMode | This defines the operating mode for the Precision Source |
| GetPrecisionSourceMode | This returns the operating mode for the Precision Source |
| SetPrecisionSourceOutput | This sets the output impedance of the Precision Source |
| GetPrecisionSourceOutput | This returns the output impedance of the Precision Source |
| ReadPrecisionSource | This performs a read operation from the Precision Source |
| DeviceNet Macros | |
| AddDeviceNet | This instantiates a DeviceNet link object; ucMacId = MAC ID Assigned To System, ucBaud = Baudrate, ulDevNum = Physical Device |
| RemoveDeviceNet | This removes (deletes) a previously instantiated DeviceNet object |
| OpenDeviceNetLinkWithType | This opens up (defines) a DeviceNet connection to a target module. It allows the message type to be defined (i.e.: Explicit). This returns a connection ID that is used with the Write & Read functions. |
| OpenDeviceNetLink | This opens up (defines) a DeviceNet connection to a target module. This returns a connection ID that is used with the Write & Read functions |
| CloseDeviceNetLink | This closes a connection that was previously opened up |
| WriteDNUnsignedChar | This writes an unsigned character to the module that is referenced by the ID parameter passed in. |
| WriteDNUnsignedShort | This writes an unsigned short to the module that is referenced by the ID parameter passed in. |
| WriteDNUnsignedInteger | This writes an unsigned integer to the module that is referenced by the ID parameter passed in. |
| WriteDNUnsignedArray | This writes an unsigned character array to the module that is referenced by the ID parameter passed in. |
| ReadDNUnsignedChar | This reads an unsigned character from the module that is referenced by the ID parameter passed in. |
| ReadDNUnsignedShort | This reads an unsigned short from the module that is referenced by the ID parameter passed in. |
| ReadDNUnsignedInteger | This reads an unsigned integer from the module that is referenced by the ID parameter passed in. |
| ReadDNUnsignedCharArray | This reads an unsigned character array from the module that is referenced by the ID parameter passed in. |
| ResetDeviceNet | This issues a reset to the DeviceNet link. |

APPENDIX-continued

MACROS

Printer Macros

| | |
|---|---|
| AddPrinter | This adds (instantiates) a Printer instrument object |
| RemovePrinter | This removes (deletes) a previously instantiated Printer object |
| SendCarriageReturnToPrinter | This forces a CARRIAGE RETURN to be sent to the printer |
| SendLineFeedPrinter | This forces a LINE FEED return to be sent to the printer |
| SendFormFeedToPrinter | This forces a FORM FEED to be sent to the printer |
| SetPrinterColumnWidth | This programs the printer's column width |
| GetColumnWidth | This returns the printer's column width |
| PrintString | This sends a NULL terminated string to the printer |
| PrintCharArray | This sends a character array to the printer |
| PrintStringDoubleSize | This sends a NULL terminated string to the printer double sized. |
| PrintCharArrayDoubleSize | This sends a character array to the printer double sized. |
| PrinterSelfTest | This performs a printer self test |
| ResetPrinter | NOP |

Miscellaneous Macros

| | |
|---|---|
| SystemReset | This issues a reset command to all instruments installed in the system |
| SystemSelfTest | This performs a selftest on each instrument installed in the tester if supported. |
| GetSystemInstrumentInfo | This returns information for each instrument installed in the test system. |
| Delay | This is a standard delay utility that delays in mSec's. This should be used instead of the sleep function since this will process and forward window messages instead of suspending the current thread (application) |
| VerifyNullTerminatedStrings | This function verifies that two null terminated strings are identical. If they are not, a CError object is thrown and is caught by the test executive. |
| VerifyDoubleValue | This function verifies that a double value is between (or equal to) a specified upper and lower limit. If it is not, then a CError object is thrown and is caught by the test executive. |
| VerifyIntegerValue | This function verifies that an integer value is between (or equal to) a specified upper and lower limit. If it is not, then a CError object is thrown and is caught by the test executive. |
| VerifyUnsignedCharacter | This function verifies that an unsigned character value is between (or equal) to a specified upper and lower limit. If it is not, then a CError object is thrown an is caught by the test executive. |
| VerifyUnsignedCharacterList | This function verifies that a list of unsigned character values are between (or equal) to a list of specified upper and lower limits. If one or more elements of the list is not, then a CError object is thrown and is caught by the test executive. |
| VerifyIntegerList | This function verifies that a list of integer values are between (or equal) to a list of specified upper and lower limits. If one or more elements of the list is not, then a CError object is thrown and is caught by the test executive. |
| VerifyDoubleList | This function verifies that a list of double values are between (or equal to) a list of specified upper and lower limits. If one or more elements of the list are not, then a CError object is thrown and is caught by the test executive. |
| VerifyIntegerArray | This function verifies that two integer arrays are identical. If the two arrays are not identical, then a CError object is thrown and is caught by the test executive. |
| VerifyUnsignedCharacterArray | This function verifies that two unsigned character arrays are identical. If the two arrays are not identical, then a CError object is thrown an is caught by the test executive. |
| VerifyUnsignedShortArray | This function verifies that two unsigned short arrays are identical. If the two arrays are not identical, then a CError object is thrown and is caught by the test executive. |
| VerifyUnsignedShort | This function verifies that an unsigned short value is between (or equal to) a specified upper and lower limit. If it is not, then a CError object is thrown and is caught by the test executive. |
| VerifyBoolean | This function verifies a boolean value. If the comparison failed, a CError object is thrown an is caught by the test executive. |
| LogError | This is a routine that will unconditionally generate an error, thereby throwing a CError object. |
| DisplayTestStep | This function will display the string passed into it as a test step on the screen. When this function is called, it DOES kick the progress bar on the GUI. |
| DisplayTestInfo | This function will display the string passed into it as test information on the screen. When this function is called, it DOES NOT kick the progress bar on the GUI. |
| GetUUTsInstalled | This is intended on being able to read the number & location of all products currently installed on the tester. |

What is claimed is:

1. A system that tests industrial control modules, comprising:
- an instrument that provides input stimulus and measurement readings;
- a test component that provides program flow to the input stimulus and measurement readings of the at least one instrument;
- an instrument component that is communicatively coupled to the instrument and has a virtual mode that runs the test component with the instrument in simulation mode;
- the instrument component further comprising a normal mode for running the instrument in live mode; and
- the instrument component is a dynamically linked library that can be broken into basic functional modules associated with the particular instrument type wherein obsolete instruments can be removed or replaced by editing the dynamically linked library.

2. The system of claim 1, further comprising at least two instruments, at least two test components, and/or at least two instrument components.

3. The system of claim 1, further comprising a test kernel component that provides a generic interface to the instrument component and the test component.

4. The system of claim 3, further comprising a test system interface that allows test selectability and test initiation to a remote source.

5. The system of claim 4, the test system interface is a graphical user interface.

6. The system of claim 1, at least one of the instrument component and the test component is a dynamically linked library.

7. The system of claim 6, the instrument component comprises at least one basic functional module associated with a particular type of the instrument.

8. The system of claim 7, the at least one basic functional module comprises at least one of a reset component, a self-test component, a setup component, and a read component.

9. The system of claim 1, the instrument component provides control to at least one instrument of the test system.

10. The system of claim 1, the test component is communicatively coupled to a test kernel component.

11. The system of claim 10, the test kernel component loads and unloads test objects, wherein the test objects are actual tests developed by a test developer.

12. A method for testing industrial control modules, comprising:
- developing at least one test template file with a plurality of test level type functions;
- compiling and linking the at least one test template file to at least one instrument component;
- executing the at least one test template file in simulation mode to determine if the at least one test template file operates properly and subsequently
- executing the at least one test template file in normal mode to test the industrial control module; and
- replacing obsolete instruments by editing a dynamically linked library (DLL) file that corresponds to the at least one instrument component.

13. The method of claim 12, developing at least one test template file comprises providing a plurality of test level type functions, function calls, and standard instrument library calls, which are commented out.

14. The method of claim 13, further comprising uncommenting the test level type functions, function calls, and standard instrument library calls for a specific unit to be tested.

15. The method of claim 14, further comprising inserting code into the at least one of the test level type functions to provide functionality to the at least one of the test level type functions.

16. The method of claim 12, further comprising decomposing the instrument component into at least one basic functional module associated with a particular type of at least one instrument that is to be tested.

17. The method of claim 16, the at least one basic functional module is at least one of a reset, self-test, setup, and read module.

18. The method of claim 12, further comprising developing the at least one test template file at a remote location.

* * * * *